United States Patent [19]
Omiya

[11] Patent Number: 6,058,274
[45] Date of Patent: May 2, 2000

[54] CAMERA

[75] Inventor: Akio Omiya, Omiya, Japan

[73] Assignee: Fuji Photo Optical Co., Ltd., Saitama, Japan

[21] Appl. No.: 09/273,749

[22] Filed: Mar. 22, 1999

[30]   Foreign Application Priority Data

Apr. 17, 1998  [JP]  Japan ................................... 10-108339

[51] Int. Cl.[7] .................................................. G03B 17/24
[52] U.S. Cl. ............................................................ 396/535
[58] Field of Search ................................. 396/535, 6, 540

[56]    References Cited

U.S. PATENT DOCUMENTS 5,708,898  1/1998  Manabe et al. ........................... 396/535
5,974,264  10/1999  Manabe et al. ........................... 396/535

*Primary Examiner*—David M. Gray
*Attorney, Agent, or Firm*—Nixon Peabody LLP; Jeffrey L. Costellia

[57] ABSTRACT

In a camera having a lens barrel in front of a camera main frame and a top body panel on an upper portion of the camera main frame, the camera has: a front cover for covering a front of the camera main frame; a top body panel cover for covering a top body panel; a bottom cover for covering a bottom of the camera main frame, said bottom cover having a configuration that a part of the bottom cover turns in a front side of the camera main frame; a decorative sheet for said front cover for covering left and right of the lens barrel, said decorative sheet having a property that it curves in such a direction that a center portion with respect to the vertical direction expands in front of the camera; and a front cover ring for covering a periphery of the lens barrel, said front cover ring pressing down said decorative sheet. The front cover ring is mounted by turning.

3 Claims, 7 Drawing Sheets

CAMERA

BACKGROUND OF THE INVENTION

1. Field of the Invention

The present invention relates to a camera having a lens housing or barrel on the front of a camera main frame and a top body panel on the upper portion of the camera main frame.

2. Description of the Related Art

Hitherto, in order to improve the external appearance of a camera, it is usual that for example, a metallic thin plate and the like, referred to as a so-called decorative sheet, which is excellent in the external appearance property on a design of the camera, is pasted or mounted on the front of the camera.

When such a decorative sheet is mounted on the front of the camera, it happens that since the decorative sheet is of a thin plate, it will be obliged to occur a difference in level on a boundary between the decorative sheet mounted on the front of the camera main frame and a top body panel cover on the upper portion of the camera main frame or a cover of the bottom of the camera, and the portion of the boundary will be turned over. Thus, there is a possibility that although the decorative sheet is used for the purpose of improvement of the external appearance, such a difference in level may bring about a result that the external appearance property is degraded.

FIG. 10 is a view of preventing means for preventing a difference in level and turning over according to the earlier technology. In FIG. 10, there is shown a boundary between a top body panel cover and a decorative sheet which are to be provided on the upper portion of a camera.

A segment 62 is welded to the top portion of the decorative sheet 61, and then the segment 62 is inserted into the inside of the top body panel cover 63. This arrangement makes it possible to prevent the turning over on the top portion of the decorative sheet 61, so that the front 63a of the top body panel cover 63 and the decorative sheet 61 forms the same plane, and thereby providing an excellent external appearance. While the relation between the top body panel cover and the decorative sheet has been explained in the above, it is the same also in the relation between the bottom cover and the decorative sheet.

However, according to the difference occurrence preventing means as shown in FIG. 10, there is a need to prepare the segment 62 to be welded to the decorative sheet 61. This is associated with the problem of the high cost.

SUMMARY OF THE INVENTION

In view of the foregoing, it is therefore an object of the present invention to provide a camera capable of preventing an occurrence of a difference in level between a decorative sheet and a top body panel cover or a cover of bottom of the camera with the low cost.

To attain the above-mentioned object, according to the present invention, there is provided a camera having a lens barrel in front of a camera main frame and a top body panel on an upper portion of the camera main frame, said camera comprising:

a front cover for covering a front of the camera main frame;

a top body panel cover for covering a top body panel;

a bottom cover for covering a bottom of the camera main frame, said bottom cover having a configuration that a part of the bottom cover turns in a front side of the camera main frame;

a decorative sheet for said front cover for covering left and right of the lens barrel, said decorative sheet having a property that it curves in such a direction that a center portion with respect to the vertical direction expands in front of the camera; and a front cover ring for covering a periphery of the lens barrel, said front cover ring pressing down said decorative sheet.

A thin metallic sheet and the like, which are used as a decorative sheet, are preserved at the material stage usually in a state that they are wound. Accordingly, it is usual that such a sheet warps in one side. The present invention utilizes the warp of a decorative sheet at the material stage. Alternatively, in the event that there is no warp at the material stage, it is acceptable that the warp is intentionally provided.

According to the present invention, the warp of a decorative sheet at the material stage is utilized so that a decorative sheet is fabricated and mounted in such a manner that the decorative sheet curves in such a direction that the center portion with respect to the vertical direction expands in front of the camera. In order to mount the decorative sheet, while it is acceptable that a pressure sensitive adhesive coated tape and an adhesive agent for instance, may be used in their combination, the decorative sheet is pressed down by the front cover ring. In this manner, the decorative sheet has a property of the warp in the direction as mentioned above, and the warp is corrected through pressing down by the front cover ring. In this case, when the upper end and the lower end of the decorative sheet are turned over, a turning direction is opposite to a direction of the warp of the decorative sheet. Thus, it is hard to be turned over. In addition, there is no need to prepare additional parts and perform a weld as in the above-mentioned earlier technology (cf. FIG. 10), and it is possible to maintain an excellent external appearance in low cost.

In the camera as mentioned above, it is preferable that said front cover ring is mounted by turning.

Since the decorative sheet has a property that it curves in such a direction that the center portion with respect to the vertical direction expands in front of the camera, there is a need for the front cover ring to suppress the decorative sheet against the pressing force of the decorative sheet. In the event that the front cover ring is mounted by the turning, it does not happen such a matter that even if the front cover ring is pressed by the decorative sheet, the front cover ring is readily off.

In the camera as mentioned above, it is preferable that said front cover ring is mounted in a state that a portion of said bottom cover, which turns in the front side of the camera main frame, is located over against a lower portion of said front cover ring with a gap.

When it is intended to suppress a difference in level between the decorative sheet and the bottom cover through pressing the decorative sheet with the front cover ring, it often happens that the bottom cover is pressed down together with the decorative sheet by the front cover ring. However, in this case, when a malfunction occurs on the camera, it is a problem as to how the camera is dismantled. It is considered that the front cover ring is first taken off. However, the front cover ring is firmly fixed not so as to readily taken off after assembling, since there is a need for the front covering to press down against the pressing force of the decorative sheet. Thus, it is disadvantageous in view of the number of steps that the front cover ring is first taken off.

In view of the foregoing, there is provided a gap between the front cover ring and the bottom cover. This feature makes it possible to first remove the bottom cover, and thereby readily dismantling the camera when a malfunction occurs.

DESCRIPTION OF THE PREFERRED EMBODIMENTS

Figure 1:
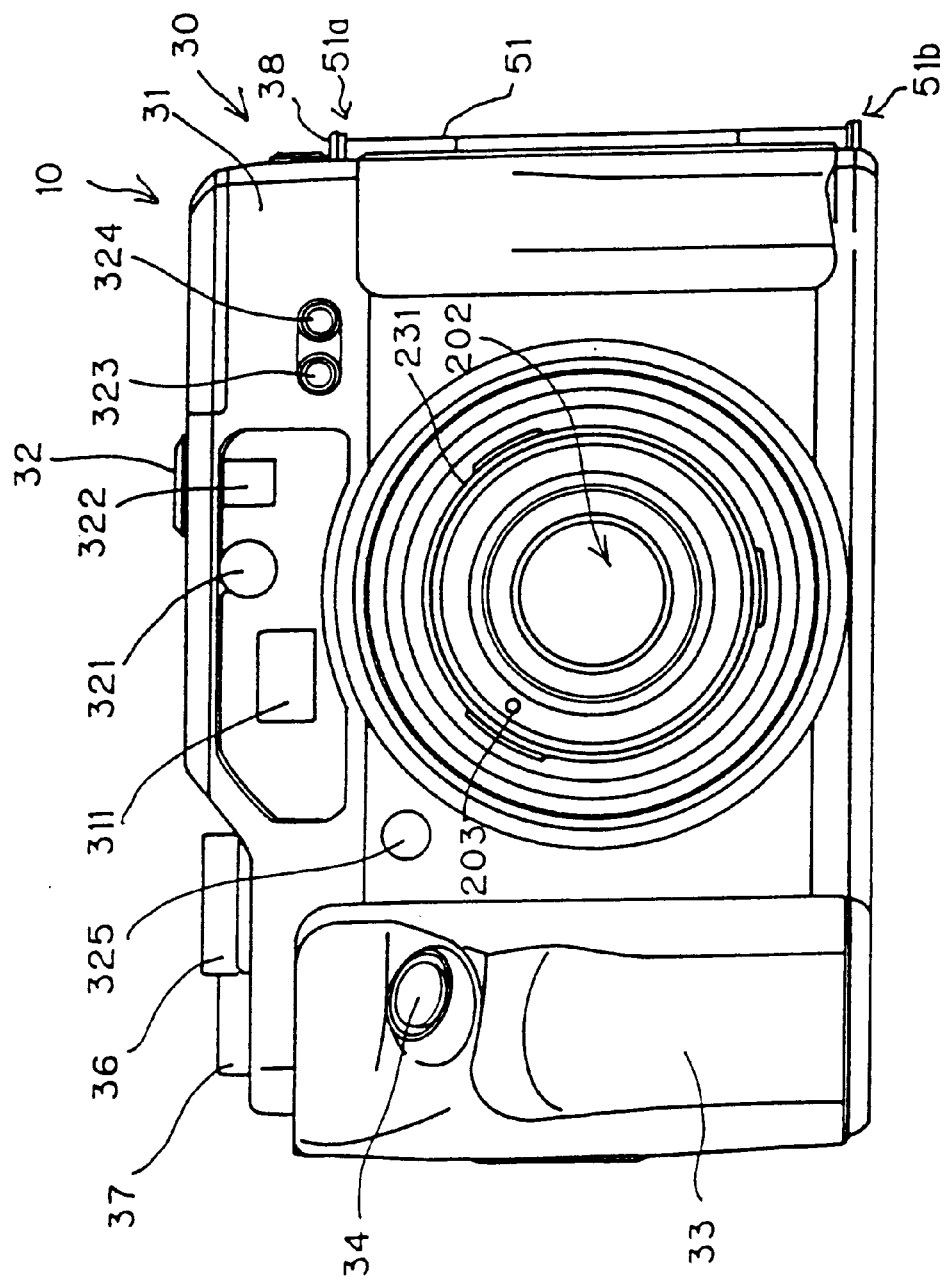
FIG. 1 is an elevational view of a camera according to an embodiment of the present invention.

Hereinafter, there will be described embodiments of the present invention.

FIGS. 1, 2, 3 and 4 are an elevational view, a plan view, a left side elevation and a right side elevation, of a camera according to an embodiment of the present invention.

A camera 10 has a zoom lens. As shown in FIG. 2, a lens barrel or housing 20 constitutes the zoom lens. The lens housing 20 comprises a fixed barrel 21, a back barrel 22 and a front barrel 23. The top of the front barrel 23 is provided with a filter ring 231 which is covered with a circular lens cap (not illustrated) to protect a photographic lens 202 (cf. FIG. 1).

Figure 2:
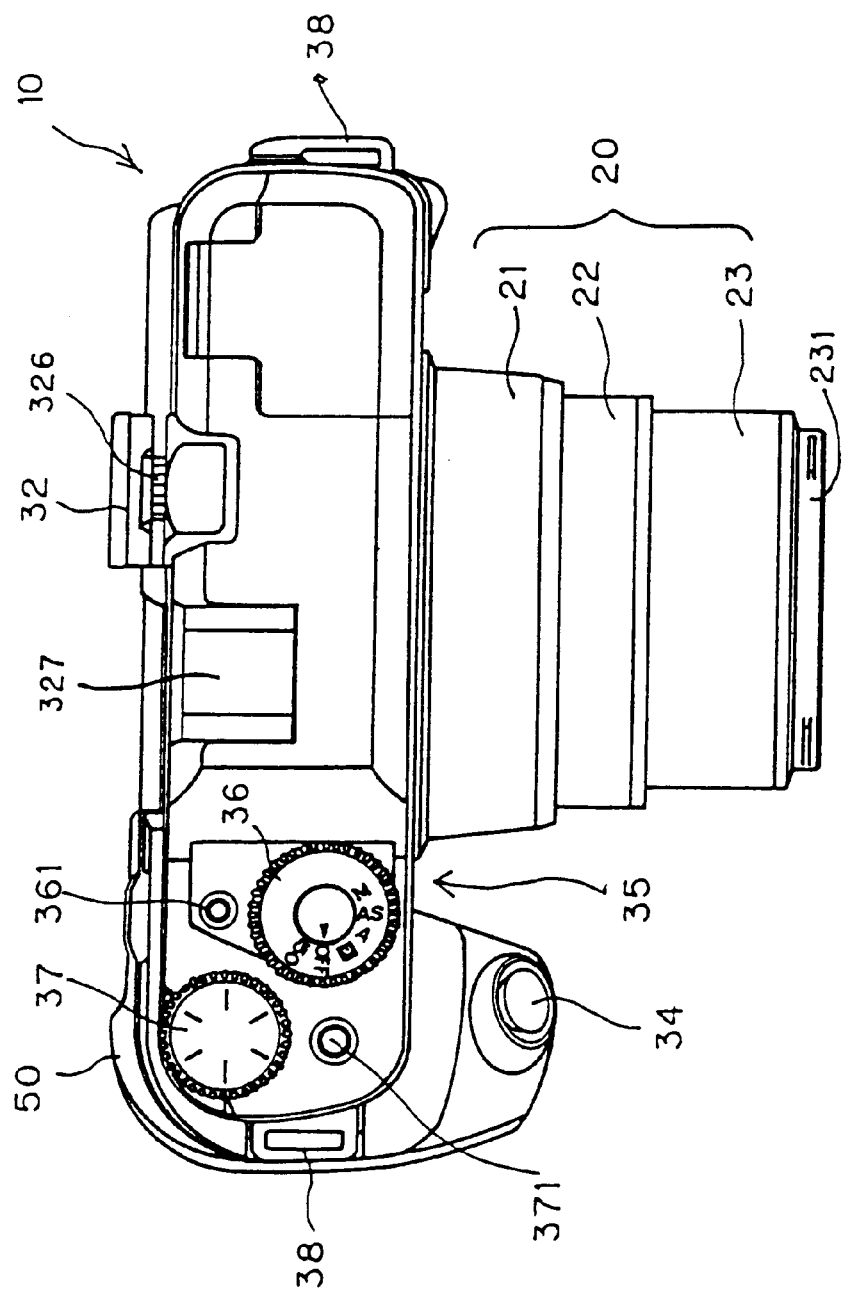
FIG. 2 is a plan view of a camera according to an embodiment of the present invention.

As shown in FIG. 1, there is disposed a cap sensor 203 at the position of the inside of the filter ring 231 and the outside of the photographic lens 202 within the front barrel 23. The cap sensor 203 is used to detect as to whether the filter ring 231 is covered with the lens cap.

Further, as seen from FIG. 1, a top body panel 31 of the upper portion of a camera main frame 30 is provided with an AF window 311 into which a sensor for an auto focus (AF) is incorporated; a finder window 321 and a light intake window 322 for a finder 32; a flash light control window 323 for guiding light to an internal electronic flash photometric sensor; and an AE window 324 for guiding light to an AE sensor for an internal exposure control. And below the top body panel 31 there is provided a self-window 325 into which a light-emitting device for emitting light in a self-timer photograph is incorporated.

Furthermore, as seen in the left side of the elevation shown in FIG. 1, the camera is provided with a grip section 33 to be grasped in a photograph. At the upper portion of the grip section 33 there is provided a shutter button 34 disposed with diagonally upward orientation and diagonally inside orientation. Between the grip section 33 and the lens housing 20, there is provided a recess 35 (cf. FIG. 2) which allows the fingertips to enter when the grip is grasped, and thus this makes it possible to easily grasp the grip section 33. As seen from FIG. 1, the shutter button 34 is disposed at a relatively lower position. It is noted that according to the present embodiment a medium-format camera is used. The arrangement of the shutter button 34 at the position in height as shown in FIG. 1 makes it possible to contribute to both an improvement of the grip performance and a facility of depression of the shutter button 34. Particularly, in the event that a photograph is taken while the camera 10 is set vertically, the arrangement of the shutter button 34 at the position and the orientation as shown in FIG. 1 makes it possible that the shutter button 34 has a sufficient operability in the photography while the camera 10 is set vertically, although there is a camera having an additional shutter button for a vertical photography.

Figure 3:
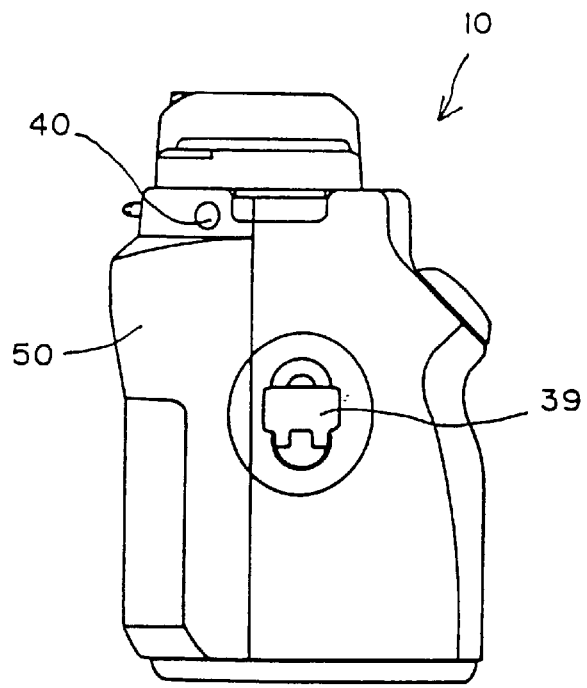
FIG. 3 is a left side elevation of a camera according to an embodiment of the present invention.
Figure 4:
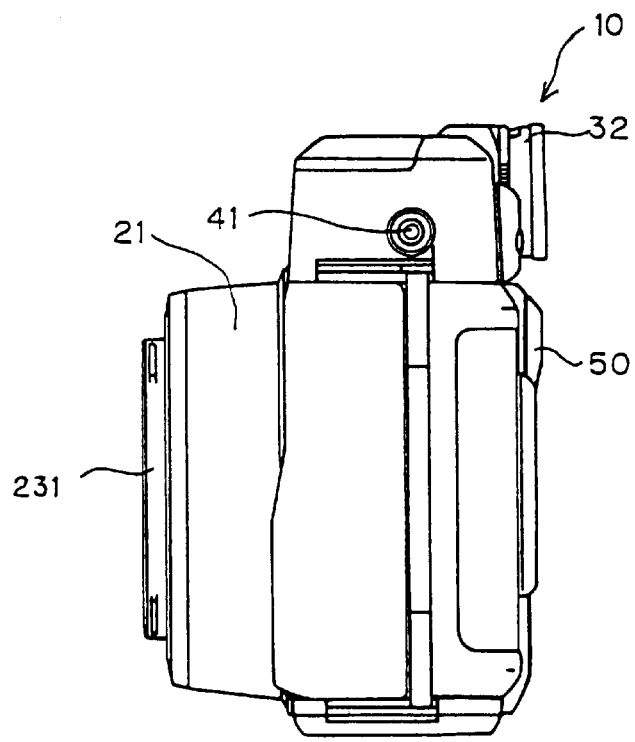
FIG. 4 is a right side elevation of a camera according to an embodiment of the present invention.

In the right side of the elevation shown in FIG. 1, there is shown a hinge 51 for switching a rear cover 50 (cf. FIGS. 2–4). Each of an upper portion 51a and a lower portion 51b of the hinge 51 has a double plate structure. The reason why this is to do so is that when the strong force is applied to the upper end or the lower end of the hinge 51 through for example, dropping the camera or hitting the camera against something, the shock force is checked by a deformation of the outside plate of the two plates of the double plate structure so as not to hinder the switching of the rear cover 50. The upper portion 51a of the hinge 51 serves as a hanger 38 which a belt for hanging the camera passes through.

In the right upper portion of the top body panel 31 shown in the elevation of FIG. 1, there is accommodated a stroboscopic light emission section employing a so-called swing-up system. According to FIG. 1, the flash light emission section is in condition for accommodation. When the flash light is used, a button (not illustrated) of the rear end of the camera is depressed so that the flash light emission section is swung up.

Further, in the left upper portion of the top body panel 31 shown in the elevation of FIG. 1, as shown in FIG. 2, there are provided a selection dial 36 for mode switching and an up-down dial 37 in an adjacent positional relationship. It is possible to turn the selection dial 36 in the state that a mode rock button 361 is depressed. Turning the selection dial 36 makes it possible to optionally select a sensitivity set up mode (ISO), a program mode (P), an aperture-priority mode (A), an additional aperture-priority mode (As) and a manual mode (M) as well as an OFF state (OFF) shown in FIG. 2.

In the sensitivity set up mode (ISO), a photographic film speed is set up manually, and a setting of the film speed can be altered by turning the up-down dial 37. The film speed thus set is indicated in an LCD (not illustrated) provided on the back cover 50.

In the program mode (P), an F-number of an aperture and a shutter speed according to a predetermined program are selected in compliance with brightness of the camera subject in photography.

In the aperture-priority mode (A) and the additional aperture-priority mode (As), an F-number of an aperture is manually set up, and a shutter speed is automatically controlled in accordance with brightness of the camera subject in photography. A difference between these two aperture-priority modes (A, As) is a shutter speed. The details will be omitted. In the aperture-priority modes (A, As), turning the up-down dial 37 makes it possible to alter an F-number. The F-number thus set up or altered may be indicated in the LCD provided on the rear cover 50.

In the manual mode (M), both the F-number of the aperture and the shutter speed are manually set up in photography. Turning the up-down dial 37 makes it possible to alter an F-number. Turning the up-down dial 37 while a Tv button is depressed makes it possible to alter the shutter speed. The F-number and the shutter speed thus set up or altered may be indicated in the LCD provided on the rear cover 50.

Further, as shown in FIG. 2, at the upper portion of the camera 10, there are provided a diopter correction dial 326 for the finder 32 and an accessory shoe 327 for fixing an electronic flash accessory (not illustrated).

Furthermore, as shown in FIG. 3, at the left side of the camera 10, there are provided a rear cover knob 39 for opening the rear cover 50 and a cable socket 40 for mounting a shutter cable.

As shown in FIG. 4, at the right side of the camera 10, there is provided a synchro-socket 41 for mounting a synchro-cable which serves to inform an electronic flash accessory of a light emitting timing.

Figure 5:
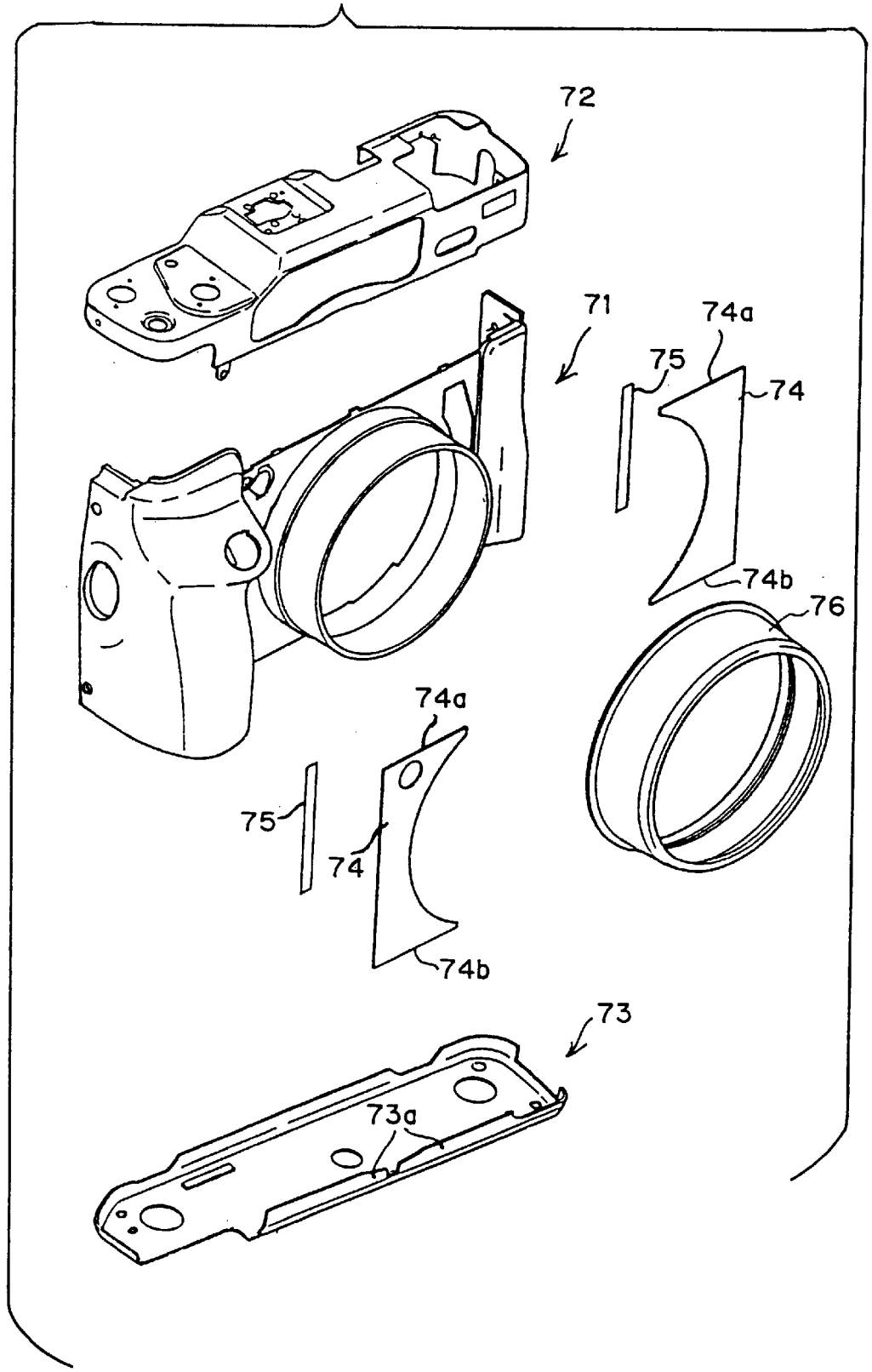
FIG. 5 is a perspective view of various covers of the respective parts (except for a back cover side) of the camera explained with reference to FIGS. 1–4.
Figure 6:
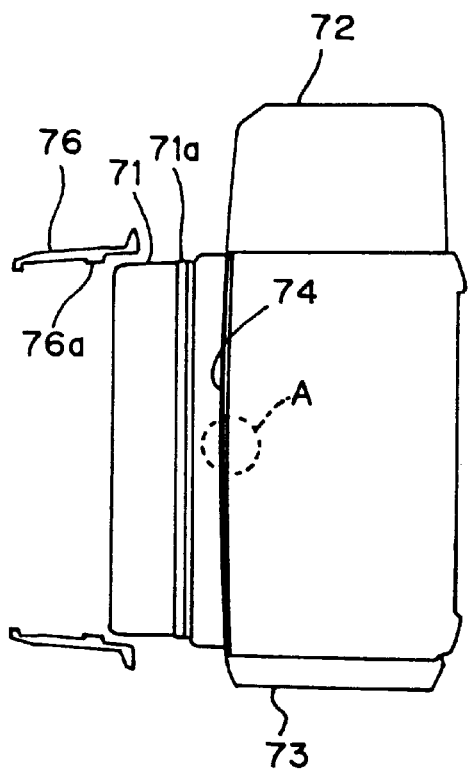
FIG. 6 is a side view of a camera in which various covers except for a front cover ring are attached.
Figure 7:
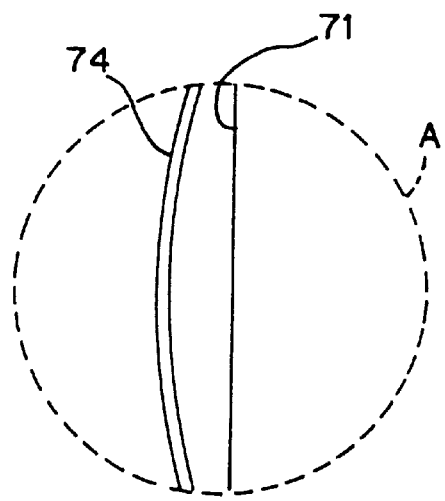
FIG. 7 is an enlarged detail of the circle A shown in FIG. 6.

FIG. 5 is a perspective view of various covers of the respective parts (except for a back cover side) of the camera explained with reference to FIGS. 1–4. FIG. 6 is a side view of a camera in which various covers except for a front covering are attached. FIG. 7 is an enlarged detail of the circle A shown in FIG. 6.

In FIG. 5, there are shown a front cover 71 for covering the front of the camera main frame, a top body panel cover 72 for covering the top body panel of the camera upper portion, a bottom cover 73 for covering the bottom of the camera, two decorative sheets 74 to be affixed to both sides of the lens barrel of the front cover 71, two pressure sensitive adhesive double coated tapes 75 for affixing those two decorative sheets 74 to the front cover 71, and a front cover ring 76 for covering the lens barrel. The bottom cover 73 has, as shown in FIG. 5, a portion 73a turning in the front side of the camera main frame. As shown in FIG. 6, the front cover ring 76 presses down the decorative sheets 74 from the front side of the camera when a screw portion 76a, in which a female screw is made up inside the front cover ring 76, engages with a screw portion 71a, in which a male screw is made up on the front cover 71. With respect to the decorative sheets 74, a portion of the side apart from the lens barrel is fixed by the pressure sensitive adhesive double coated tape 75, while a portion near the lens barrel is held down by the front cover ring 76.

Each of the decorative sheets 74 have a property that it curves in such a direction that the center portion with respect to the vertical direction expands in front of the camera, utilizing a warp of the material of the decorative sheet 74. Consequently, at the stage that the decorative sheet 74 is simply fixed by the pressure sensitive adhesive double coated tape 75, as shown in FIG. 7, the center portion with respect to the vertical direction still expands in front of the camera. For this reason, the decorative sheet 74 is held down by the front cover ring 76 whereby the curve of the decorative sheet 74 is cured.

While the decorative sheet 74 is held down by the front cover ring 76, the decorative sheet 74 has a property that it curves in the direction as mentioned above. Thus, it is possible to prevent an upper edge 74a and a lower edge 74b of the decorative sheet 74 (cf. FIG. 5) from being turned over in the front side of the camera thereby preventing occurrence of a difference in level on a boundary between the top body panel cover 72 and the bottom cover 73 of the camera. Thus, it is possible to maintain a good appearance.

Figure 8A:
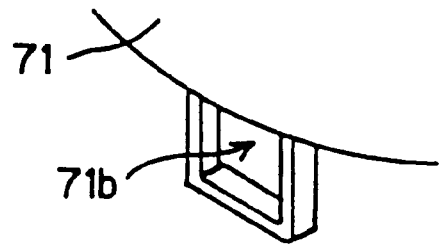
FIGS. 8(A) and 8(B) are views each showing a relationship between a front cover ring lower portion and a front cover and a bottom cover.
Figure 8B:
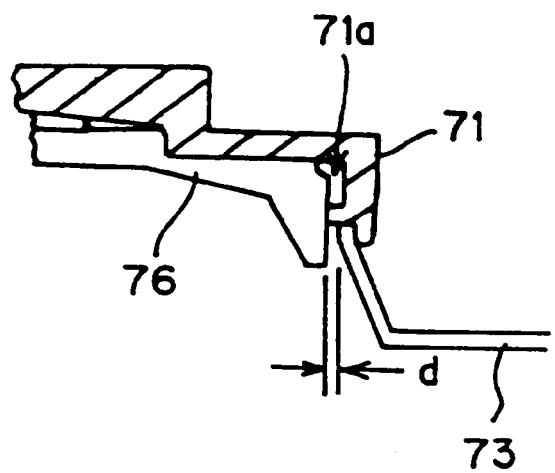

FIGS. 8(A) and 8(B) are views each showing a relationship between a front cover ring lower portion and a front cover and a bottom cover.

On the portion corresponding to the lens barrel lower portion of the front cover 71, there is formed a paste accumulator 71b into which an adhesive agent is poured. Prior to mounting the front cover ring 76, the adhesive agent is poured into the paste accumulator 71b. Thus, shown in FIG. 6, when the screw portion 76a of the front cover ring 76 engages with the screw portion 71a of the front cover 71 so that the front cover ring 76 is mounted on the front cover 71, the front cover ring 76 is in contact with the adhesive agent poured into the paste accumulator 71b thereby preventing turning of the front cover ring 76 once mounted and whereby the front cover ring 76 is not readily removed.

Here, as shown in FIG. 8(B), in the state that attachment of the front cover ring 76 has been completed, there is formed a gap d between the front cover ring 76 and the bottom cover 73. Forming the gap in this portion makes it possible, in the event that a malfunction occurs on the camera and thus an overhaul is needed, to remove the bottom cover 73 without the front cover ring 76 being a hindrance, and thereby contributing to improvement of a working efficiency in an overhaul.

Figure 9:
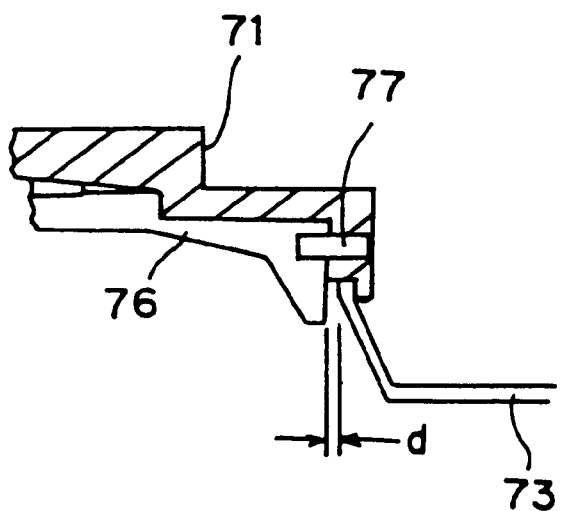
FIG. 9 is a view useful for understanding an alternative embodiment of means for preventing turning of the front cover ring.
Figure 10:
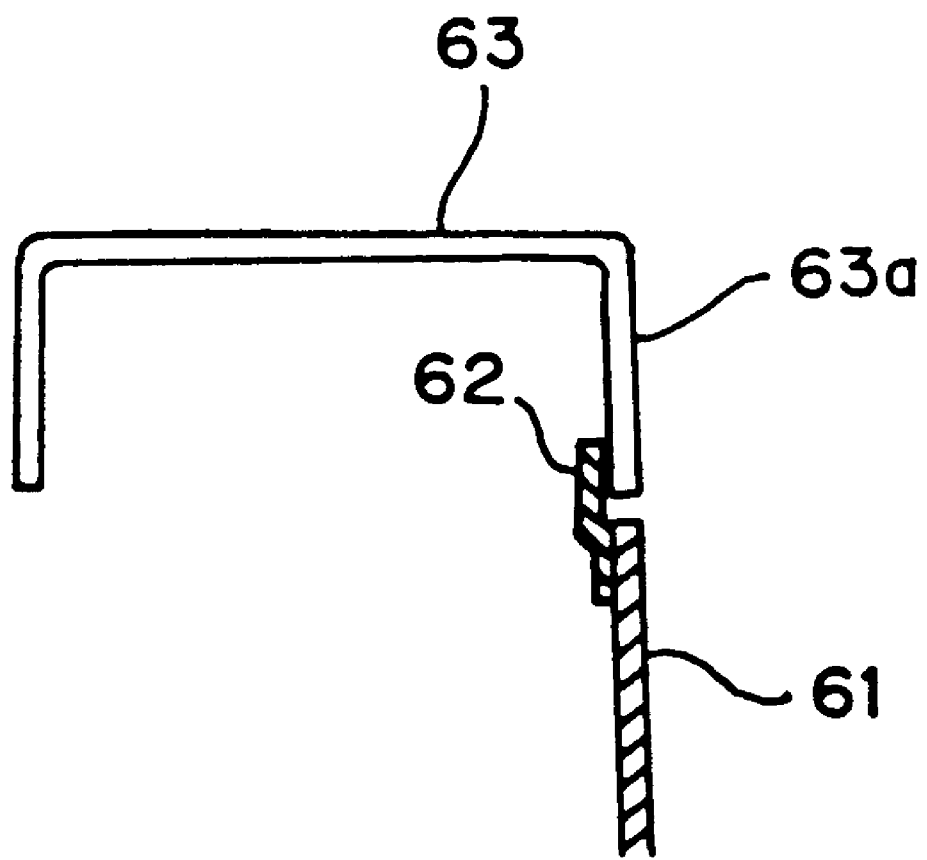
FIG. 10 is a view of preventing means for preventing a difference in level and turning over according to the earlier technology.

FIG. 9 is a view useful for understanding an alternative embodiment of means for preventing turning of the front cover ring.

According to the embodiment shown in FIGS. 8(A) and 8(B), there is formed the paste accumulator 71b on the front cover 71, and an adhesive agent is poured into the paste accumulator 71b, thereby contributing to baffling the front cover ring 76. On the other hand, according to the embodiment shown in FIG. 9, after the front cover ring 76 is mounted on the front cover ring 71, a pin 77 is inserted from the inside of the camera passing through the front cover 71 and the front cover ring 76. In this manner, it is acceptable that a baffle of the front cover ring 76 is implemented to prevent the front cover ring 76 from being out of place. The bottom cover 73 is attached after the pin 77 is inserted. Also in his case, since there is provided a gap between the front cover ring 76 and the bottom cover 73, it is possible to detachably mount the bottom cover 73.

According to the embodiments mentioned above, the front cover ring 76 is attached by an engagement of the screws. However, it is acceptable that the front cover ring 76 is attached by a bayonet engagement structure instead of the screws.

Alternatively, it is acceptable that the front cover ring 76 is of other than an arrangement in which the front cover ring 76 is attached by turning, for example, an arrangement in which the front cover ring 76 is fixed on the main frame of a camera by several screws.

As mentioned above, according to the present invention, it is possible to provide a camera capable of suppressing turning over of a decorative sheet and preventing an occurrence of a difference in level between a decorative sheet and a top body panel cover or a cover of bottom of the camera with the low cost, the camera having a good external appearance.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A camera having a lens barrel in front of a camera main frame and a top body panel on an upper portion of the camera main frame, said camera comprising:

a front cover for covering a front of the camera main frame;

a top body panel cover for covering a top body panel;

a bottom cover for covering a bottom of the camera main frame, said bottom cover having a configuration that a part of the bottom cover turns in a front side of the camera main frame;

a decorative sheet for said front cover for covering left and right of the lens barrel, said decorative sheet having a property that it curves in such a direction that a center portion with respect to the vertical direction expands in front of the camera; and a front cover ring for covering a periphery of the lens barrel, said front cover ring pressing down said decorative sheet.

2. A camera according to claim 1, wherein said front cover ring is mounted by turning.

3. A camera according to claim 1, wherein said front cover ring is mounted in a state that a portion of said bottom cover, which turns in the front side of the camera main frame, is located over against a lower portion of said front covering with a gap.

* * * * *